US009987616B2

(12) United States Patent
Thevasahayam

(10) Patent No.: US 9,987,616 B2
(45) Date of Patent: Jun. 5, 2018

(54) PREPARATION AND USE OF MAGNETIC POLYMER NANOCOMPOSITES

(71) Applicant: EMPIRE TECHNOLOGY DEVELOPMENT LLC, Wilmington, DE (US)

(72) Inventor: Arockiadoss Thevasahayam, Madurai (IN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 179 days.

(21) Appl. No.: 14/769,819

(22) PCT Filed: Apr. 15, 2013

(86) PCT No.: PCT/IB2013/052985

§ 371 (c)(1),
(2) Date: Aug. 23, 2015

(87) PCT Pub. No.: WO2014/132107

PCT Pub. Date: Sep. 4, 2014

(65) Prior Publication Data

US 2016/0001263 A1 Jan. 7, 2016

(30) Foreign Application Priority Data

Feb. 27, 2013 (IN) ............................ 870/CHE/2013

(51) Int. Cl.
*B01D 53/02* (2006.01)
*B01J 20/28* (2006.01)
(Continued)

(52) U.S. Cl.
CPC ........ *B01J 20/28009* (2013.01); *B01D 53/02* (2013.01); *B01D 53/261* (2013.01);
(Continued)

(58) Field of Classification Search
CPC ...... B01D 2253/1124; B01D 2253/202; B01D 2253/25; B01D 2253/304;
(Continued)

(56) References Cited

U.S. PATENT DOCUMENTS 4,211,664 A 7/1980 Dixon et al.
5,492,754 A 2/1996 Chen
(Continued)

FOREIGN PATENT DOCUMENTS

WO 2007082103 A2 7/2007
WO 2010043914 A2 4/2010

OTHER PUBLICATIONS

"Alumina Adsorbent Desiccants," accessed at https://web.archive.org/web/20110914084939/http://www.admiraltyindustries.com/alumina.html, accessed on Aug. 13, 2015, p. 1.
(Continued)

*Primary Examiner* — Christopher P Jones

(57) ABSTRACT

A magnetic polymer nanocomposite is provided. The magnetic polymer nanocomposite includes a polymeric matrix and plurality of magnetic nanoparticles embedded within the polymeric matrix. The polymeric matrix of the magnetic polymer nanocomposite is configured to adsorb water molecules as air is passed through the nanocomposite and is configured to release the adsorbed water molecules on exposure of the nanocomposite to an electromagnetic field.

16 Claims, 6 Drawing Sheets

300
316
CONTROL MODULE
304
312
314
N
306
COMPOSITE DESICCANT 302
S
308
304
310
318

(51) Int. Cl.

| | |
|---|---|
| ***B01D 53/28*** | (2006.01) |
| ***B01D 53/26*** | (2006.01) |
| ***B01J 20/06*** | (2006.01) |
| ***B01J 20/24*** | (2006.01) |
| ***B01J 20/26*** | (2006.01) |
| ***B01J 20/34*** | (2006.01) |
| ***C02F 1/32*** | (2006.01) |
| *F28F 25/00* | (2006.01) |

(52) U.S. Cl.

CPC .............. *B01D 53/28* (2013.01); *B01J 20/06* (2013.01); *B01J 20/24* (2013.01); *B01J 20/261* (2013.01); *B01J 20/262* (2013.01); *B01J 20/28007* (2013.01); *B01J 20/28021* (2013.01); *B01J 20/28023* (2013.01); *B01J 20/28026* (2013.01); *B01J 20/28033* (2013.01); *B01J 20/3441* (2013.01); *C02F 1/32* (2013.01); *B01D 2253/1124* (2013.01); *B01D 2253/202* (2013.01); *B01D 2253/25* (2013.01); *B01D 2253/304* (2013.01); *B01D 2255/20738* (2013.01); *B01D 2255/20746* (2013.01); *B01D 2255/20753* (2013.01); *B01D 2257/80* (2013.01); *B01D 2258/06* (2013.01); *B01D 2259/40098* (2013.01); *C02F 2303/04* (2013.01); *F28F 2025/005* (2013.01)

(58) Field of Classification Search

CPC ........... B01D 2255/20738; B01D 2255/20746; B01D 2255/20753; B01D 2257/80; B01D 2258/06; B01D 2259/40098; B01D 53/02; B01D 53/261; B01D 53/28; B01J 20/06; B01J 20/24; B01J 20/261; B01J 20/262; B01J 20/28007; B01J 20/28009; B01J 20/28021; B01J 20/28023; B01J 20/28026; B01J 20/28033; B01J 20/3441; C02F 1/32; C02F 2303/04; F28F 2025/005

See application file for complete search history.

(56) References Cited

U.S. PATENT DOCUMENTS

| | | | |
|---|---|---|---|
| 5,575,832 | A | 11/1996 | Boyd |
| 6,048,515 | A | 4/2000 | Kresse et al. |
| 6,706,097 | B2 | 3/2004 | Zornes |
| 8,043,414 | B2 | 10/2011 | Jeng et al. |
| 2002/0066368 | A1 | 6/2002 | Zornes |
| 2003/0153457 | A1 | 8/2003 | Nemoto et al. |
| 2008/0311813 | A1 | 12/2008 | Ting et al. |
| 2011/0232485 | A1 | 9/2011 | Ellsworth |

OTHER PUBLICATIONS

"Climate/humidity table," accessed at https://web.archive.org/web/20130218135143/http://www.tis-gdv.de/tis_e/misc/klima.htm, accessed on Aug. 13, 2015, pp. 2.

Elsarrag, E., "Dehumidification of air by chemical liquid desiccant in a packed column and its heat and mass transfer effectiveness," HVAC&R Research, vol. 12, Issue 1, pp. 3-16 (Jan. 2006).

International Search Report International Application No. PCT/IB2013/52985 dated Oct. 2, 2013.

Kozubal, E., et al., "Desiccant Enhanced Evaporative Air-Conditioning (DEVap): Evaluation of a New Concept in Ultra Efficient Air Conditioning," National Renewable Energy Laboratory, pp. 1-71 (Jan. 2011).

Lowenstein, A., "Review of Liquid Desiccant Technology for HVAC Applications," American Society of Heating, vol. 14, No. 6, pp. 819-839 (Nov. 2008).

Zhu, H-Y., et al., "Novel magnetic chitosan/poly(vinyl alcohol) hydrogel beads Preparation, characterization and application for adsorption of dye from aqueous solution," Bioresource Technology, vol. 105, pp. 24-30 (Feb. 2012).

400

500

PREPARATION AND USE OF MAGNETIC POLYMER NANOCOMPOSITES

CROSS-REFERENCE TO RELATED APPLICATIONS

This Application is a U.S. National Stage filing under 35 U.S.C. § 371 of International Application No. PCT/IB2013/052985 filed on Apr. 15, 2013, and entitled "PREPARATION AND USE OF MAGNETIC POLYMER NANOCOMPOSITES" which claims priority under 35 U.S.C. 119(a) and 119(b) of India Patent Application No. 870/CHE/2013 filed on Feb. 27, 2013, and entitled "PREPARATION AND USE OF MAGNETIC POLYMER NANOCOMPOSITES". The disclosures of the PCT Application and the India Application are herein incorporated by reference in their entireties.

BACKGROUND OF DISCLOSURE

Thermally driven air conditioning units that use liquid desiccants as a working fluid are used in a variety of heating, ventilation and air conditioning (HVAC) applications. Typically, the type of desiccant used by liquid desiccant air conditioners (LDACs) has a profound effect on the design of such units. Glycols and solutions of halide salts are used as liquid desiccants in some industrial equipment. For example, halide salts such as lithium chloride and lithium bromide are currently used as desiccants in certain HVAC applications. However, such salts are relatively expensive and their solutions are corrosive to most ferrous and nonferrous metals. Moreover, glycol is volatile and needs regular replacements thereby making it expensive as well as harmful to the environment.

In certain HVAC systems, activated alumina is used as the desiccant. However, activated alumina is heated to a temperature of about 2000° C. for regeneration. Certain other systems use polymer-based desiccants such as poly-vinyl alcohol foam and calcium chloride. Such desiccants require heating for regeneration of the material and even small quantities of carbon dioxide in the atmosphere can render the material inactive over a period of time.

SUMMARY OF THE DISCLOSURE

The foregoing summary is illustrative only and is not intended to be in any way limiting. In addition to the illustrative aspects, embodiments, and features described above, further aspects, embodiments, and features will become apparent by reference to the drawings and the following detailed description.

Briefly, in accordance with one aspect, magnetic polymer nanocomposites are provided. The magnetic polymer nanocomposites include a polymeric matrix and plurality of magnetic nanoparticles embedded within the polymeric matrix. The polymeric matrix of the magnetic polymer nanocomposite is configured to adsorb water molecules as air is passed through the nanocomposite and is configured to release the adsorbed water molecules on exposure to an electromagnetic field.

In accordance with another aspect, methods of extracting moisture from an environment are provided. The methods include passing air through a magnetic polymer nanocomposite placed in the environment to adsorb water molecules by the nanocomposite. The methods also include exposing the magnetic polymer nanocomposite to an electromagnetic field to release the adsorbed water molecules.

In accordance with another aspect, composite desiccants are provided. The composite desiccants include a polyvinyl alcohol-chitosan film and a plurality of non oxide ($Fe_3O_4$) nanoparticles embedded within the polyvinyl alcohol-chitosan film. The polyvinyl alcohol-chitosan film is configured to adsorb water molecules as air is passed through the composite desiccants and to release the adsorbed water molecules on exposure of the composite desiccants to an electromagnetic field.

In accordance with another aspect, systems for extracting moisture from an environment are provided. The systems include a composite desiccant having a plurality of magnetic nanoparticles embedded within a polymeric matrix. The composite desiccant is configured to adsorb water molecules from the environment. The systems also include a plurality of magnets configured to apply an electromagnetic field to the composite desiccant to release the adsorbed water molecules from the composite desiccant.

DETAILED DESCRIPTION OF DISCLOSURE

Figure 1:
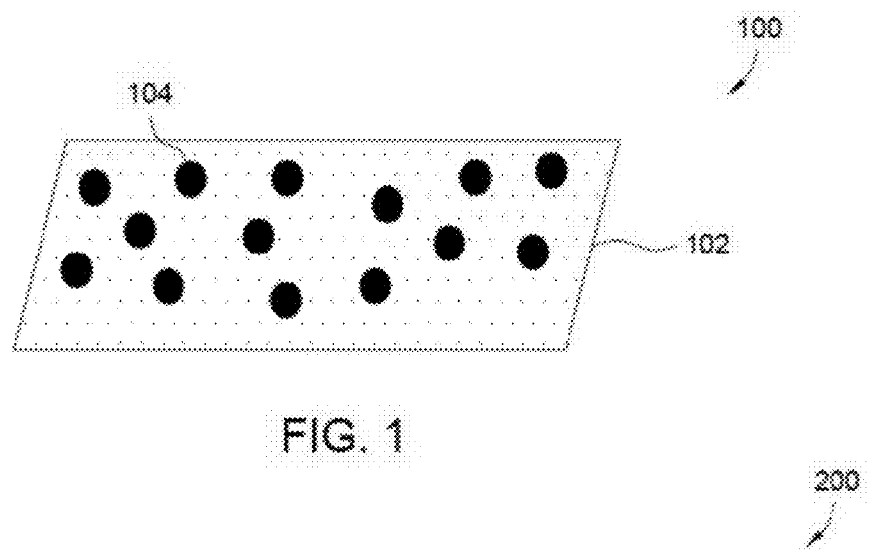
FIG. 1 is an example configuration of a magnetic polymer nanocomposite.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

It will also be understood that any compound, material or substance which is expressly or implicitly disclosed in the specification and/or recited in a claim as belonging to a group or structurally, compositionally and/or functionally related compounds, materials or substances, includes individual representatives of the group and all combinations thereof. While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

Example embodiments are generally directed to techniques of forming magnetic polymer nanocomposites. The present techniques provide magnetic polymer nanocomposites that have magnetic nanoparticles embedded in a polymer matrix. Such magnetic polymer nanocomposites can adsorb water molecules as air is passed through the nanocomposites and can subsequently release the adsorbed water molecules on exposure to an electromagnetic field thereby regenerating the magnetic polymer nanocomposite. The magnetic polymer nanocomposites formed using the present technique may be used for variety of applications such as in air-conditioning, industrial dehumidifiers, recovery of water from cooling towers, extracting water from air in humid areas/coastal regions, ships and so forth.

Referring now to FIG. 1, an example configuration 100 of a magnetic polymer nanocomposite is illustrated. In the illustrated embodiment, the magnetic polymer nanocomposite 100 includes a polymeric matrix 102 and a plurality of magnetic nanoparticles 104 embedded within the polymeric matrix 102. Examples of materials used for polymeric matrix include, but are not limited to, polyvinyl alcohol (PVA), polypyrrole (PPy), polymethyl methacrylate (PMMA), polyethylene glycol (PEG), polypropylene, chitosan, collagen, or combinations thereof. In one example embodiment, the polymeric matrix 102 includes a polyvinyl alcohol-chitosan film. In one example embodiment, a concentration of polyvinyl alcohol in the magnetic polymer nanocomposite 100 is about 3 weight percentage (wt %) to about 5 wt %. Moreover, a concentration of chitosan in the magnetic polymer nanocomposite 100 is about 10 wt % to about 15 wt %.

Examples of magnetic nanoparticles 104 include, but are not limited to, iron oxide ($Fe_3O_4$) nanoparticles, nickel oxide ($N_2O$) nanoparticles, cobalt oxide ($CoO_3$) nanoparticles, or combinations thereof. In one example embodiment, a concentration of the magnetic nanoparticles 104 in the magnetic polymer nanocomposite 100 is about 2.0 wt % or less of the PA-chitosan solution, in another embodiment, the concentration can be about 0.5 wt % to about 1.5 wt % of the PVA-chitosan solution. In certain embodiments, an average size of the magnetic nanoparticles 104 is about 50 nanometers (nm) to about 100 nanometers. Specific examples of sizes include about 50 nm, about 60 nm, about 70 mm, about 80 nm, about 90 nm about 100 nm, and ranges between any two of these values (including endpoints). The magnetic polymer nanocomposite 100 may be formed in different shapes and sizes. For example, the magnetic polymer nanocomposite 100 may be formed as nanocomposite fibers, nanocomposite mesh and nanocomposite microspheres. A variety of other configurations may be envisaged.

The magnetic polymer nanocomposite 100 described above may be used as a desiccant in air conditioning systems, dehumidifying systems and for extracting moisture from environments such as humid areas, coastal regions and ships. The method of extraction of moisture using the magnetic polymer nanocomposite 100 will be described with reference to FIG. 2.

Figure 2:
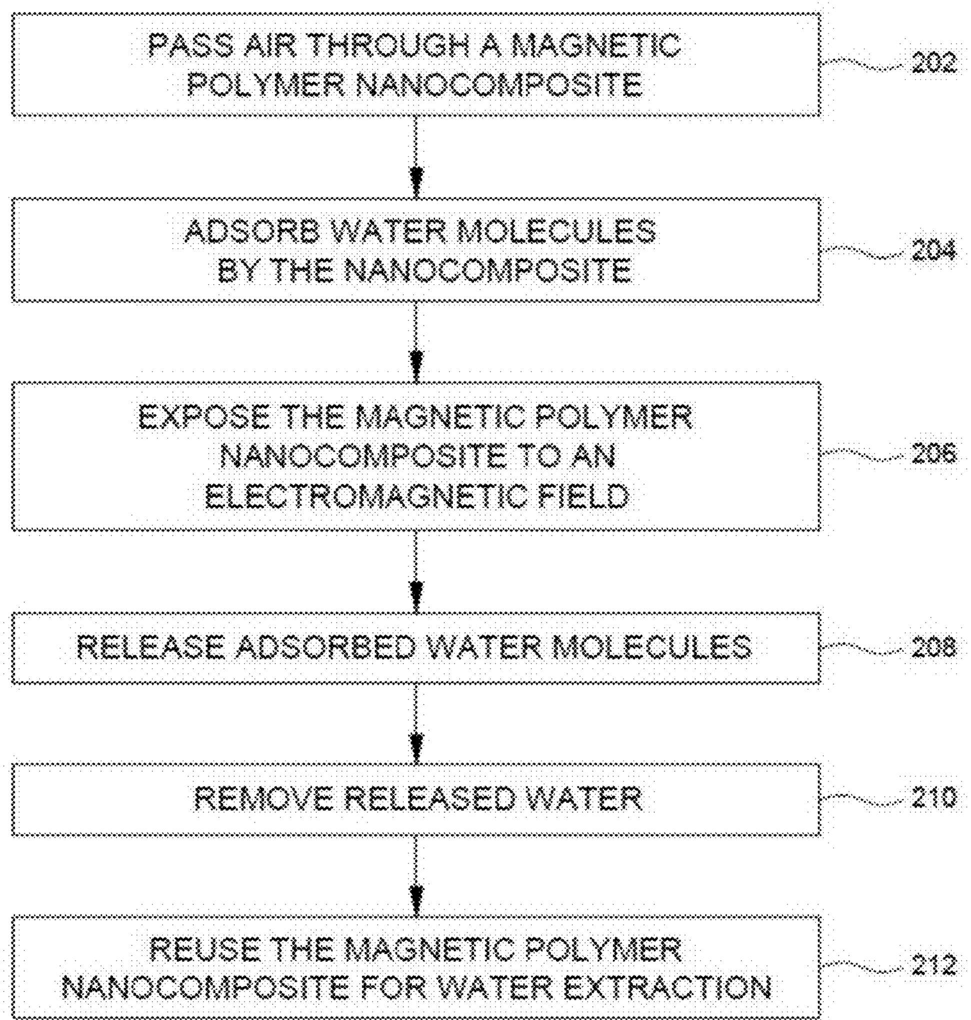
FIG. 2 is an example flow diagram of an embodiment of a method of extracting moisture from an environment.

Referring now to FIG. 2, an example flow diagram 200 of an embodiment of a method of extracting moisture from an environment is illustrated. At block 202, air is passed through a magnetic polymer nanocomposite placed in the environment. In this embodiment, the magnetic polymer nanocomposite includes a polymer matrix having a plurality of magnetic nanoparticles embedded therein. Examples of materials used for polymeric matrix include, but are not limited to, polyvinyl alcohol (PVA), polypyrrole (PPy), polymethyl methacrylate (PMMA), polyethylene glycol (PEG), polypropylene, chitosan, collagen, or combinations thereof. Moreover, the plurality of magnetic nanoparticles may include, but are not limited to, iron oxide ($Fe_3O_4$) nanoparticles, nickel oxide ($Ni_2O_3$) nanoparticles, cobalt oxide ($CoO_3$) nanoparticles, or combinations thereof.

At block 204, the water molecules in the environment are adsorbed by the magnetic polymer nanocomposite. Here, the adsorption of water molecules by the magnetic polymer nanocomposite is a physisorption process. At block 206, the magnetic polymer nanocomposite is exposed to an electromagnetic field. In certain example embodiments, a magnetic flux density of the applied electromagnetic field is about 3 MHz to about 10 MHz. In some embodiments, a humidity of the environment is measured and the magnetic flux density of the electromagnetic field is controlled based upon the measured humidity.

At block 208, the applied electromagnetic field depolarizes the polar bond between the water molecules and the magnetic polymer nanocomposite, thereby releasing the adsorbed water molecules. In particular, as the magnetic polymer nanocomposite is exposed to the electromagnetic field, the electron clouds of the polymeric matrix such as PVA are pulled towards the core of the composite thereby breaking the weak adsorption bond between the polymeric matrix and the water molecules and releasing the water molecules. At block 210, the magnetic polymer nanocomposite is regenerated by removing the released water and the nanocomposite may be reused for water extraction (block 212).

In one example embodiment, the magnetic polymer nanocomposite used for extracting moisture is formed of a polyvinyl alcohol-chitosan film and plurality of iron oxide ($Fe_3O_4$) nanoparticles embedded within the polyvinyl alcohol-chitosan film. In one example, a concentration of water adsorbed by this magnetic polymer nanocomposite is about 50 wt % to 75 wt %. In one example, the concentration of water released by the composite desiccant upon exposure to the electromagnetic field is about 90 to 95% of the adsorbed water. In some examples, more than 95 of the adsorbed water can be released. In an ideal case, about 100% of the adsorbed water can be released.

Figure 3:
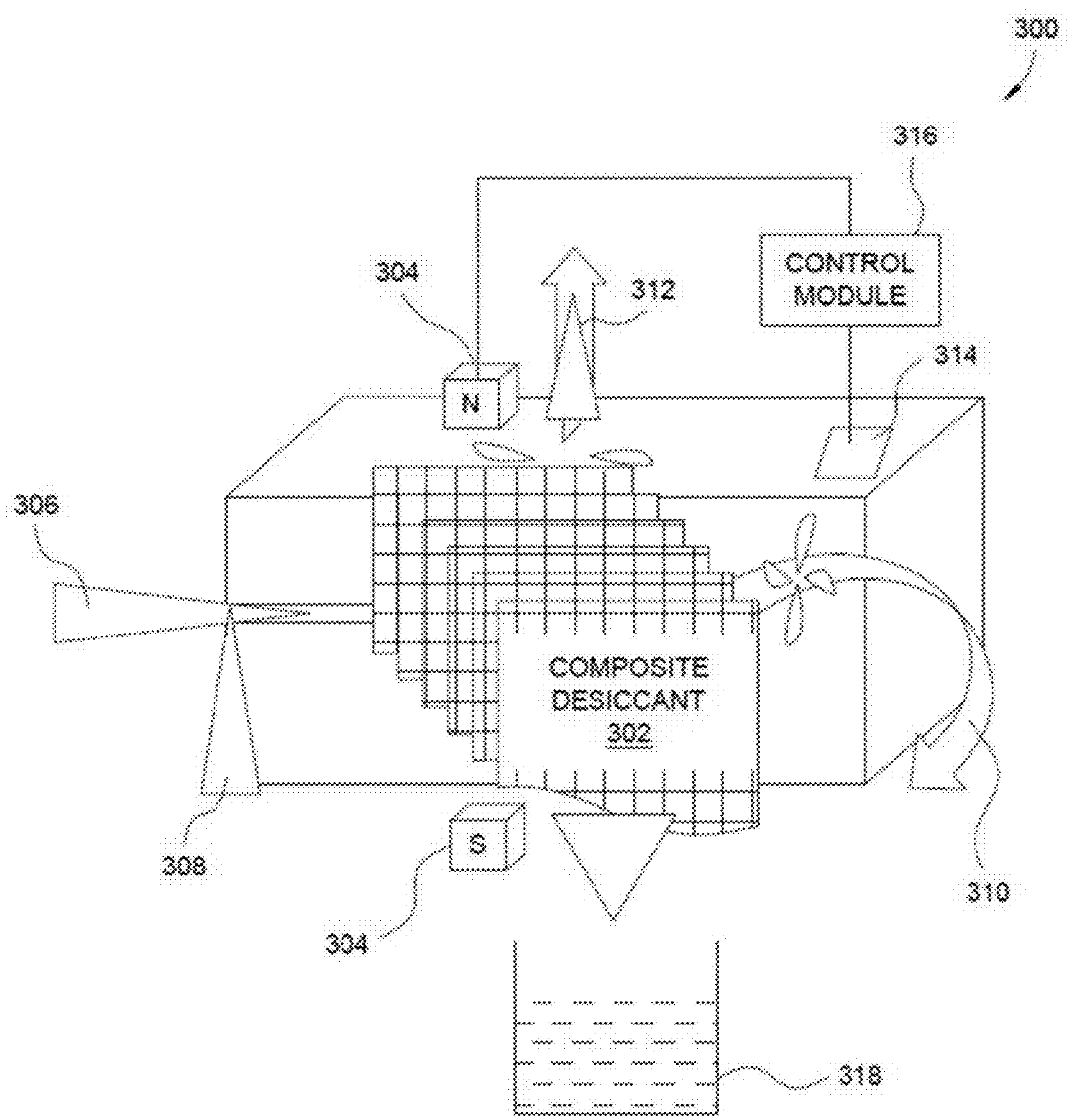
FIG. 3 is an example configuration of a system for extracting moisture from an environment.

FIG. 3 illustrates an example configuration 300 of a system for extracting moisture from an environment. In this example embodiment, the system 300 includes an air conditioning unit having a composite desiccant 302. In the illustrated embodiment, the composite desiccant 302 is formed of a plurality of nanoparticles embedded within a polymeric matrix. In this embodiment, the composite desiccant 302 includes a woven mesh of iron oxide nanoparticles embedded in polyvinyl alcohol-chitosan films. The composite desiccant 302 is configured to adsorb water molecules as air is passed through the composite desiccant 302.

The system 300 further includes a plurality of magnets such as represented by reference numerals 304 configured to apply an electromagnetic field to the composite desiccant 302 to release the adsorbed water molecules from the composite desiccant 302. The magnets 304 may be bonded magnets, rare earth magnets, or combinations thereof. In this embodiment, the magnets 304 are placed exterior to the system 300. In certain embodiments, the magnets 304 may be placed within the system 300. In the illustrated embodiment, outdoor and return airflows are represented by reference numerals 306 and 308 respectively. Moreover, conditioned and the exhaust an flows are represented by reference numerals 310 and 312 respectively.

The system 300 further includes a sensing device 314 configured to measure a humidity of the environment. In addition, a control module 316 is coupled to the sensing device 314 and the magnets 304 to control a magnetic flux density of the applied electromagnetic field based upon the measured humidity.

In operation, as the air 306 is passed through the composite desiccant 302 placed in the air-intake chambers of the system 300, the composite desiccant 302 adsorbs water molecules. Upon saturation, the electromagnetic field is applied to the composite desiccant 302 using the magnets 304 to release the adsorbed water molecules. The released water may be collected in a water collection unit 318. The collected water may be made potable upon filtering and disinfecting with UV light.

It should be noted that such moisture removal substantially reduces the compressor load of the air conditioning unit 300 through latent cooling effect by use of the composite desiccant 302 described above. The composite desiccant 302 may be formed in various configurations such as it may be drawn into fine fibers and woven as mesh or made as microspheres for providing increased surface area to increase moisture adsorption capacity of the composite desiccant 302. Depending on a desired configuration of the system 300 such as an air conditioning system or a dehumidifying system, film or woven mesh may be used for various applications.

The present technique of forming the magnetic polymer nanocomposites is simple and may be scalable for large-scale manufacturing. The magnetic polymer nanocomposites described above such as polyvinyl alcohol-chitosan films embedded with iron oxide nanoparticles can be used with existing HVAC systems to reduce power requirements of such systems. The technique provides fast regeneration of such nanocomposites upon exposure to electromagnetic fields thereby reducing the overall operating costs.

EXAMPLES

The present invention will be described below in further detail with examples and comparative examples thereof, but it is noted that the present invention is by no means intended to be limited to these examples.

Example 1: Formation of a Polyvinyl Alcohol (PVA)-Chitosan Film

A PVA-chitosan film was formed by mixing about 3 milligram (mg) of polyvinyl alcohol and about 100 milliliter (ml) of water and the resultant solution was heated to a temperature of about 85° C. to about 90° C. with stirring until PVA was completely dissolved to thrill. PVA solution. In another container, about 25 mg of chitosan was dissolved in a solution of about 12 ml of acetic acid and about 36 ml of de-ionized (DI) water and the solution was stirred for about 1 hour at a temperature of about 85° C. to about 90° C. to form a chitosan solution. Subsequently, about 3 ml of the PVA solution was mixed with the chitosan solution and the resultant solution was then casted on a polystyrene plate having a diameter of about 3.6 cm, which was dried, in vacuum for about 24 hours at room temperature to form the PVA-chitosan film.

Example 2: Synthesis of Iron Oxide ($Fe_3O_4$) Nanoparticles

Iron oxide nanoparticles were synthesized using iron oxide ($Fe_2O_3$). Here, about 5 gm of $Fe_2O_3$ was placed in a quartz tube and the tube was vacuumed at a pressure of about $10^{-3}$ Torr and was sealed. The sealed tube was then placed in a furnace maintained at a temperature of about 600° C. for about 12 hours. Subsequently, the quartz tube was removed from the furnace and the vacuum seal was removed. At this point, about 10 ml of methanol added was added and the iron oxide nanoparticles were collected from the tube.

Example 3: Characterization of Iron Oxide Nanoparticles

Figure 4:
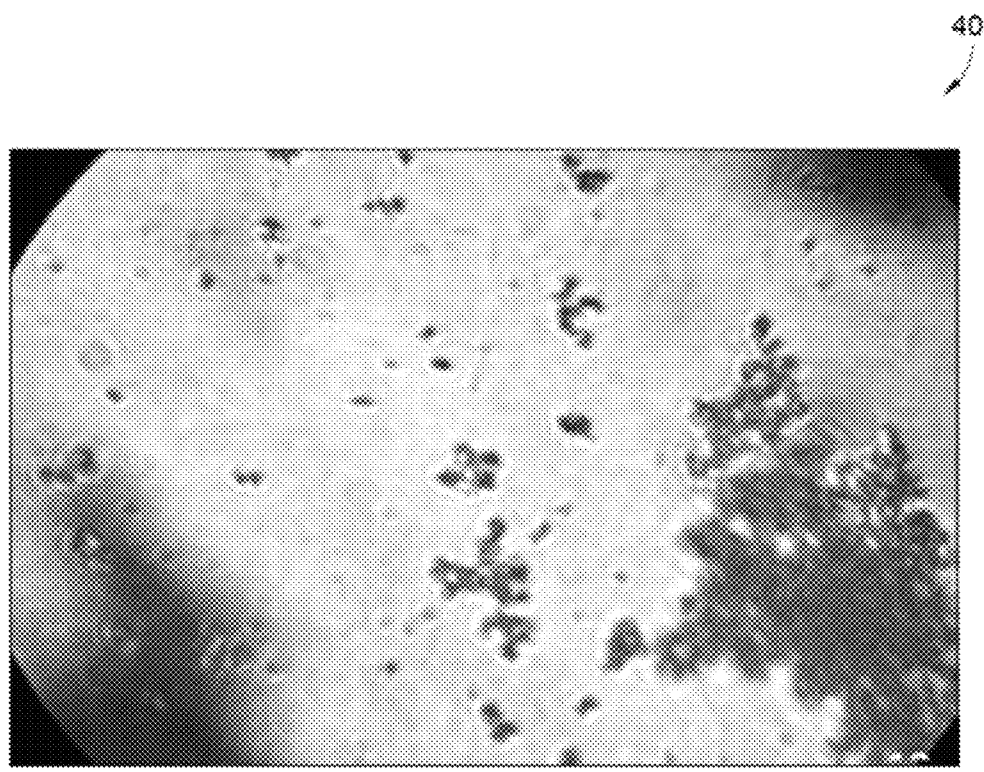
FIG. 4 is an optical image illustrating iron oxide nanoparticles.
Figure 5:
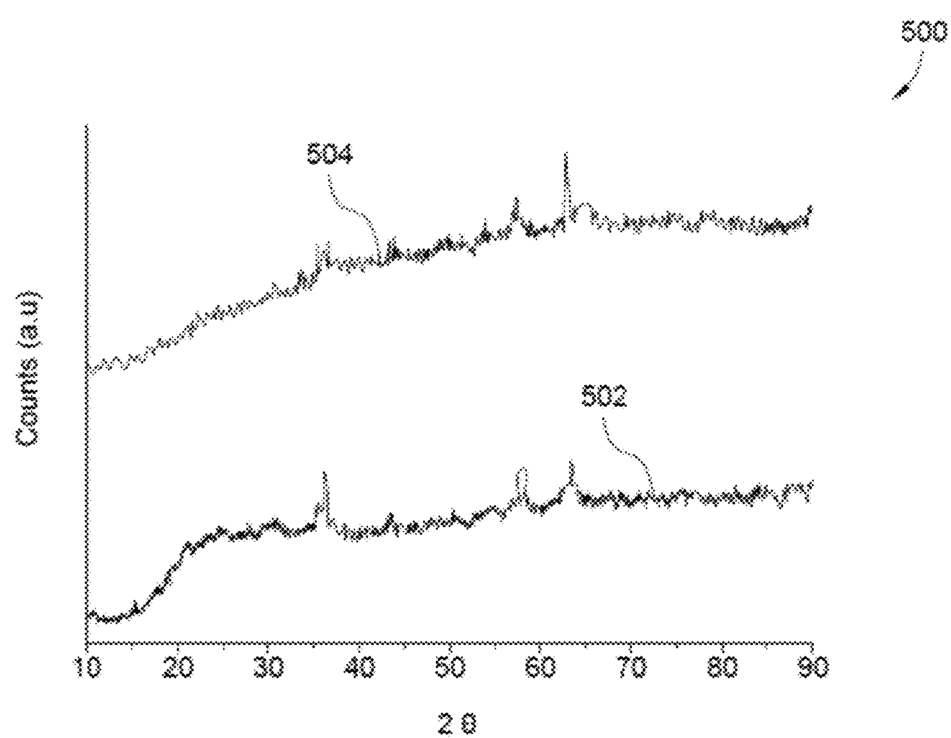
FIG. 5 is an example X-ray diffraction (XRD) pattern of iron oxide nanoparticles of FIG. 4.

The iron oxide ($Fe_3O_4$) nanoparticles synthesized using the process described in Example 2 were characterized using Zeiss inverted optical microscope and XRD analytical system commercially available from PANalytical, Inc. The Netherlands. FIG. 4 is a magnified optical image 400 illustrating iron oxide nanoparticles synthesized using the process described in Example 2. As can be seen, clusters of $Fe_3O_4$ magnetic nanoparticles were observed. FIG. 5 illustrates example X-ray diffraction (XRD) pattern 500 of iron oxide nanoparticles formed using the process described in Example 2. The XRD patterns for $Fe_2O_3$ and the $Fe_3O_4$ nanoparticles are represented by reference numerals 502 and 504. As can be seen, the XRD counts for $Fe_3O_4$ nanoparticles are substantially higher than the counts for the $Fe_2O_3$.

Example 4: Formation of a Magnetic Polymer Nanocomposite with Iron Oxide Nanoparticles Embedded in a Polyvinyl Alcohol (PVA)-Chitosan Film To prepare the magnetic polymer nanocomposite, about 3 ml of the solution prepared by mixing the PVA and chitosan solutions of Example 1 was mixed with about 1 mg of $Fe_3O_4$ nanoparticles powder formed in Example 2 and the mixture was stirred for about 1 hour. The mixture was subsequently cast on a 6-well plate formed of polystyrene having a diameter of about 3.6 cm and was dried in vacuum for about 24 hours at room temperature.

Example 5: Characterization of the Magnetic Polymer Nanocomposite Formed in Example 4

Figure 6:
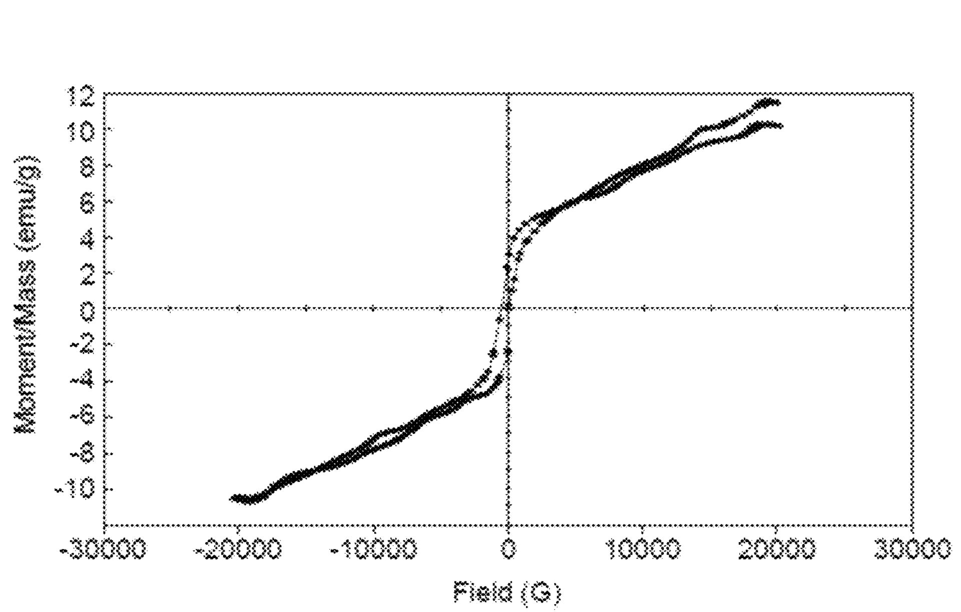
FIG. 6 is a graphical representation of magnetic properties of a magnetic polymer nanocomposite.

The magnetic polymer nanocomposite formed in Example 4 was analyzed for its paramagnetic behavior using a vibrating sample magnetometer (VSM). Here, Lakeshore VSM 7410 commercially available from Lakeshore Cryotronics Inc. (Westerville, Ohio, USA) was used for analyzing the magnetic polymer nanocomposite. FIG. 6 is an example graph 600 representative of the magnetic properties of the magnetic polymer nanocomposite measured using VSM 7410. Here, the coercivity of the magnetic polymer nanocomposite was measured to be about 378.39 G. As can be seen, the measurements from the VSM are indicative of the material being super-paramagnetic as the coercivity of the material is low.

Example 6: Measurement of Desiccant Properties of the Magnetic Polymer Nanocomposite of Example 4

Figure 7:
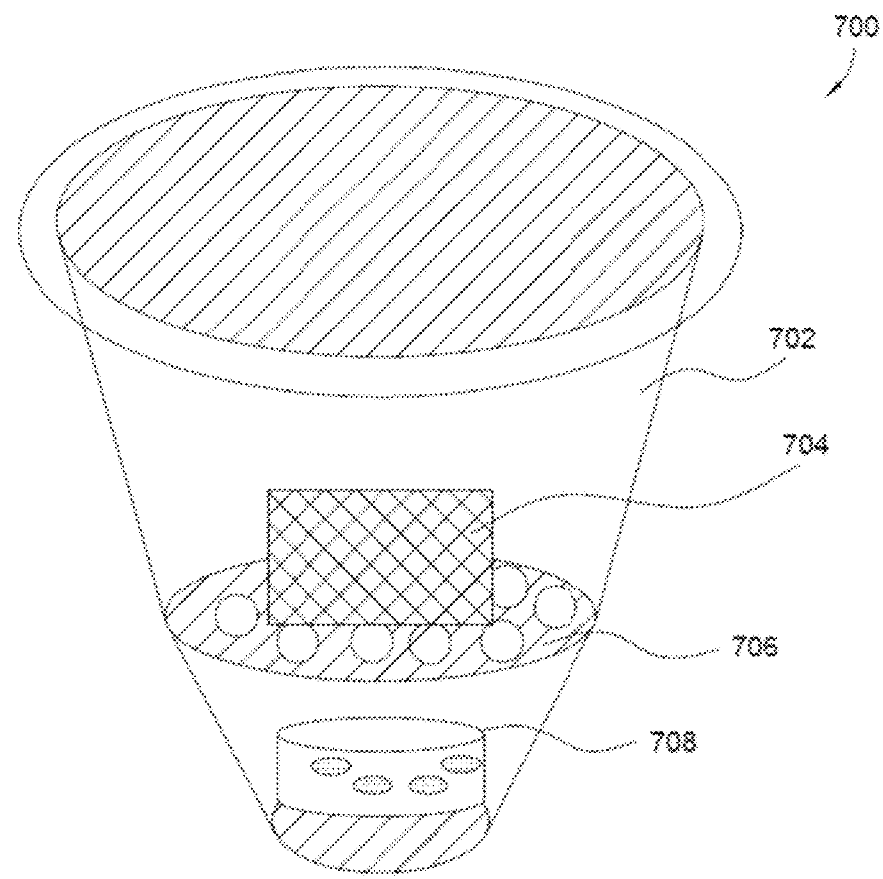
FIG. 7 is an example humidity chamber used for measuring desiccant properties of the magnetic polymer nanocomposite.

The desiccant properties such as a measure of the water adsorbed and released from pure PVA film, pure chitosan film, PVA with chitosan film, PVA-iron nanoparticles and the magnetic polymer nanocomposite of Example 4 were measured. These materials were placed in a humidity chamber 700 such as illustrated in FIG. 7. The humidity chamber 700 included a glass desiccator block 702 and the different films described above (generally represented by reference numeral 704) were placed on a glass holder 706 within the humidity chamber 700. Here, humidity was created within the humidity chamber 700 using saturated NaCl by a humidity generator 708 placed within the humidity chamber 700 and the desiccant properties a all the films were measured.

Example 7: Experimental Results for Desiccant Properties of the Films Placed in the Humidity Chamber 700 of Example 6

Figure 8:
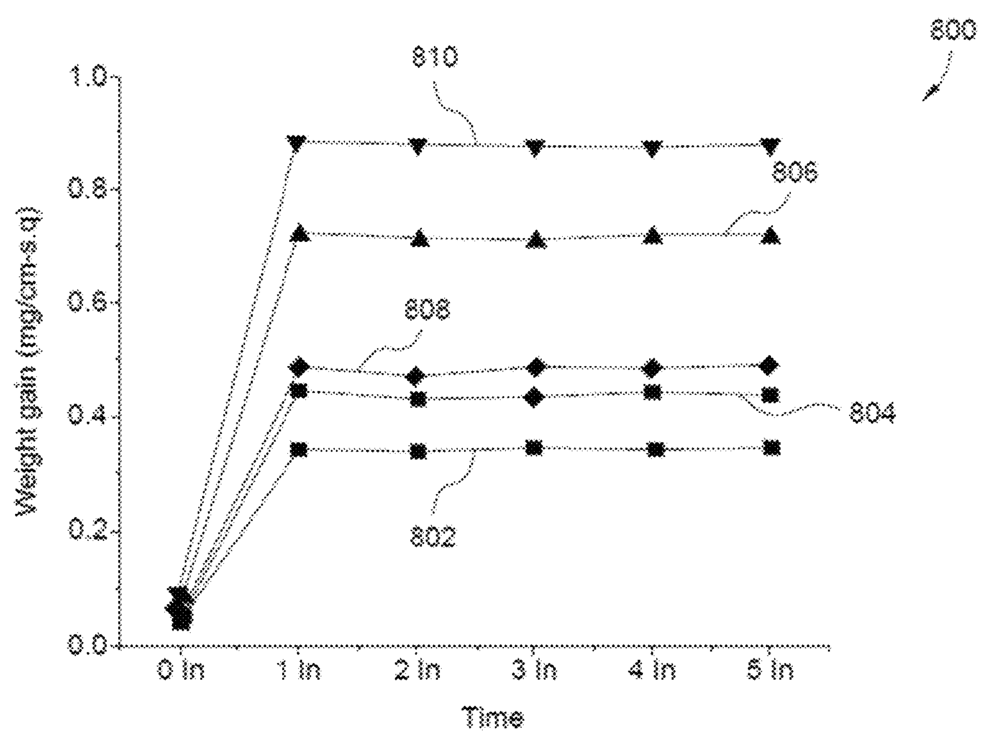
FIG. 8 is a graphical representation of weight gain of different composite films placed in the humidity chamber of FIG. 7.

FIG. 8 is a graphical representation 800 of weight gain of the different composite films placed in the humidity chamber 700. The weight gain for the pure PVA film, pure chitosan film, PVA with chitosan film, PVA-iron nanoparticles and the magnetic polymer nanocomposite of Example 4 are represented by reference numerals 802, 804, 806, 808 and 810 respectively. As can be seen, the magnetic polymer nanocomposite with iron oxide nanoparticles embedded in a polyvinyl alcohol (PVA)-chitosan film adsorbs relatively higher quantities of water (about 0.11 gram/cm square) over a time period of about 1 hour as compared to the other films.

Figure 9:
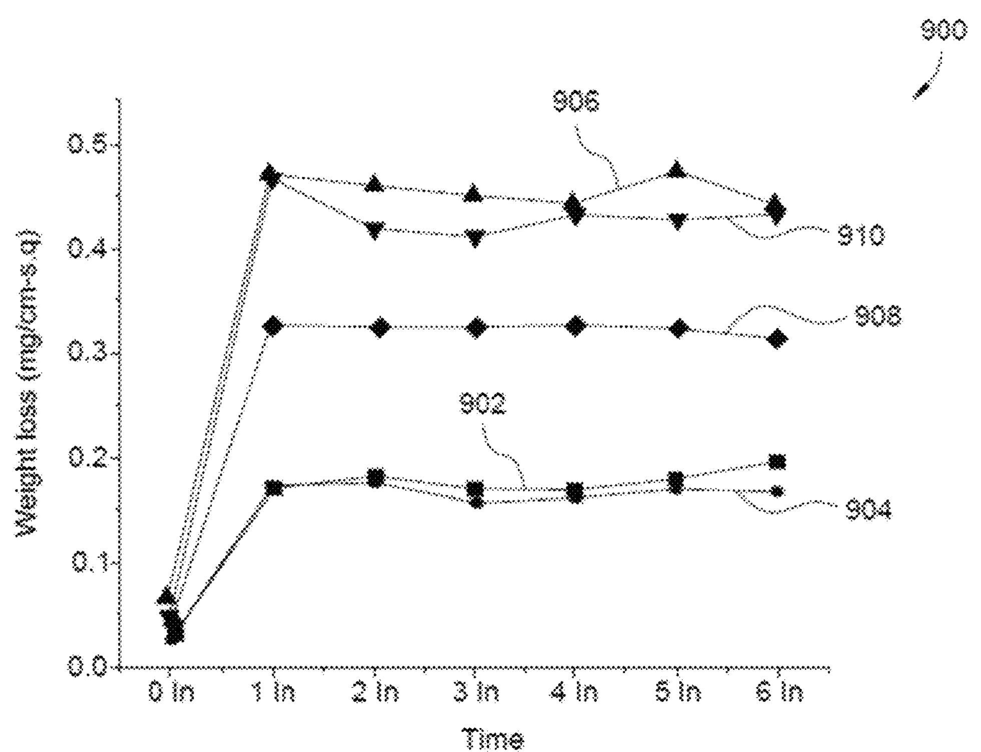
FIG. 9 is a graphical representation of weight loss of different composite films placed in the humidity chamber of FIG. 7 on application of an electromagnetic field.

FIG. 9 is a graphical representation 900 of weight loss of different composite films placed in the humidity chamber on application of an electromagnetic field. The weight loss for the pure PVA film, pure chitosan film, PVA with chitosan film, PVA-iron nanoparticles and the magnetic, polymer nanocomposite of Example 4 are represented by reference numerals 902, 904, 906, 908 and 910 respectively. As can be seen, the magnetic polymer nanocomposite film releases relatively higher quantities of water in about 1 minute duration and thereby achieving a weight loss of about 0.47 mg/cm$^2$ as compared to the other films.

Figure 10:
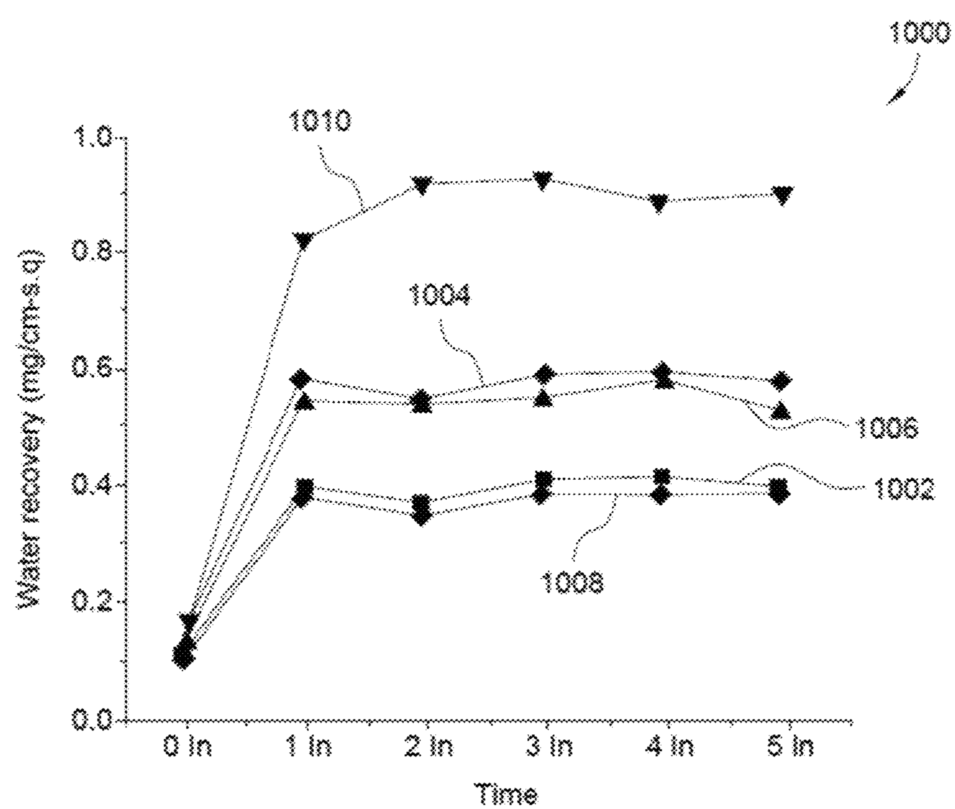
FIG. 10 is a graphical representation of water recovery from different composite films placed in the humidity chamber of FIG. 7 on application of an electromagnetic field.

FIG. 10 is a graphical representation 1000 of water recovery (mg/cm$^2$) from different composite films placed in the humidity chamber on application of an electromagnetic field. The water recovery for the pure PVA film, pure chitosan film, PVA with chitosan film, PVA-iron nanoparticles and the magnetic polymer nanocomposite of Example 4 are represented by reference numerals 1002, 1004, 1006, 1008 and 1010 respectively. As can be seen, the recovery of adsorbed water from the magnetic polymer nanocomposite film is relatively higher as compared to the other films.

Figure 11:
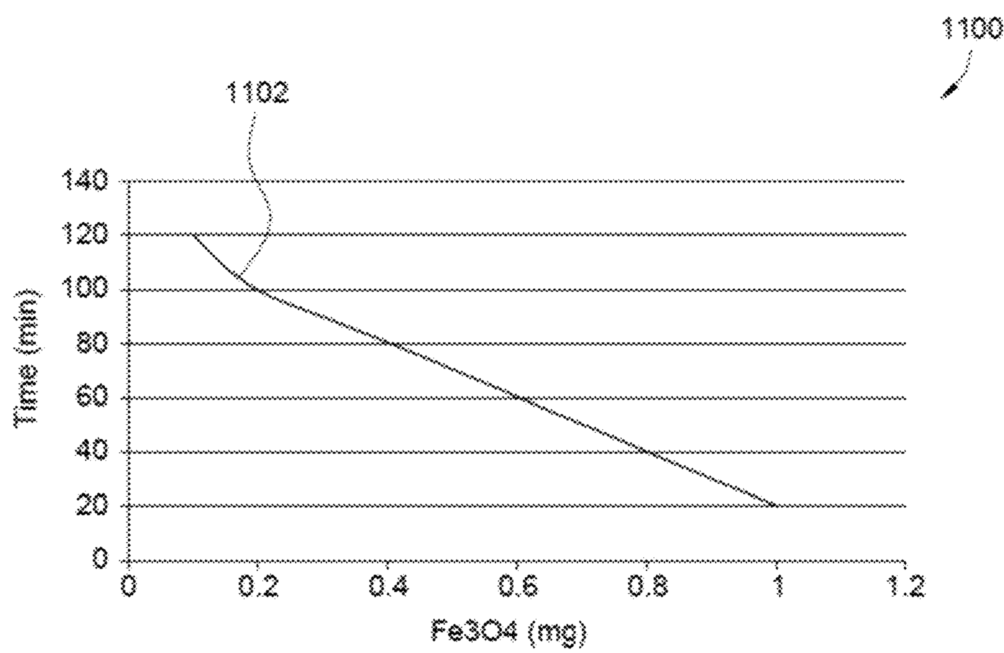
FIG. 11 is a graphical representation of a saturation time of the magnetic polymer nanocomposite with different doping levels of the iron nanoparticles.

Example 8: Experimental Result for Saturation Time of the Magnetic Polymer Nanocomposite for Different Levels of Doping of $Fe_3O_4$ Nanoparticles A polyvinyl alcohol (PVA)-chitosan film (2 cm×2 cm) with embedded iron nanoparticles was exposed to an air-conditioner in an enclosed room having RH of about 76% and a room temperature of 25° C. for about 5 minutes. The film adsorbed approximately 8.7 mg of water and subsequently released about 8.3 mg of water upon exposure to electromagnetic field (a release of about 95%). FIG. 11 is a graphical representation 1100 of saturation tune of the magnetic polymer nanocomposite with different doping levels of the iron nanoparticles. The profile for the sample described above is represented by reference numeral 1102. As can be seen, the metal doping of chitosan and then embedding it within PVA polymer-chitosan base enhances the water vapor absorption capacity and subsequent release of water from the magnetic polymer nanocomposite.

Example 9: Formation of Magnetic Polymer Nanocomposite Microspheres

Magnetic polymer nanocomposite microspheres were formed for providing enhanced water adsorption properties. Here, about 20 ml of sesame oil was placed in a container and was heated to a temperature of about 120 degrees while stirring vigorously. Moreover, about 5 ml of the solution prepared by mixing the PVA and chitosan solutions of Example 1 was gradually added to the heated sesame oil using a syringe. The formed microspheres were then filtered and collected from the container. The microspheres were washed with dilute citric acid and were subsequently separated using magnets.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The present disclosure is to be limited only by the terms of the appended claims, along with the flail scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least" the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

As will also be understood by one skilled in the art all language such as "up to," "at least," "greater than," "less than," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A magnetic polymer nanocomposite comprising:

a polymeric matrix comprising polyvinyl alcohol-chitosan; and a plurality of magnetic nanoparticles embedded within the polymeric matrix, wherein the polymeric matrix of the magnetic polymer nanocomposite is configured to adsorb water molecules as air is passed through the nanocomposite and is configured to release the adsorbed water molecules on exposure of the nanocomposite to an electromagnetic field.

2. The magnetic polymer nanocomposite of claim 1, wherein the polymeric matrix further comprises polypyrrole (PPy), poly(methyl methacrylate (PMMA), polyethylene glycol (PEG), polypropylene, collagen, or combinations thereof.

3. The magnetic polymer nanocomposite of claim 1, wherein the plurality of magnetic nanoparticles comprise iron oxide ($Fe_3O_4$) nanoparticles, nickel oxide ($Ni_2O_3$) nanoparticles, cobalt oxide ($CoO_3$), or combinations thereof.

4. The magnetic polymer nanocomposite of claim 1, wherein the magnetic polymer nanocomposite is configured for use as a desiccant in an air conditioning system, a dehumidifying system, or combinations thereof.

5. A composite desiccant comprising:

a polyvinyl alcohol-chitosan film; and a plurality of iron oxide ($Fe_3O_4$) nanoparticles embedded within the polyvinyl alcohol-chitosan film, wherein the polyvinyl alcohol-chitosan film is configured to adsorb water molecules as air is passed through the composite desiccant and to release the adsorbed water molecules on exposure of the composite desiccant to an electromagnetic field.

6. The composite desiccant of claim 5, wherein a concentration of water adsorbed by the composite desiccant is about 50 wt % to about 75 wt %.

7. The composite desiccant of claim 5, wherein a concentration of water released by the composite desiccant upon exposure of the composite desiccant to the electromagnetic field is about 90% to about 95% of the adsorbed water.

8. A system for extracting moisture from an environment, the system comprising:

a composite desiccant having a plurality of magnetic nanoparticles embedded within a polymeric matrix, wherein the polymeric matrix comprises polyvinyl alcohol-chitosan, and wherein the composite desiccant is configured to adsorb water molecules from the environment, and a plurality of magnets configured to apply an electromagnetic field to the composite desiccant to release the adsorbed water molecules from the composite desiccant.

9. The magnetic polymer nanocomposite of claim 1, wherein the magnetic polymer nanocomposite is formed as one or more of nanocomposite fibers, a nanocomposite mesh and nanocomposite microspheres.

10. The magnetic polymer nanocomposite of claim 1, wherein an average size of the plurality of magnetic nanoparticles is in a range between about 50 nanometers and about 100 nanometers.

11. The magnetic polymer nanocomposite of claim 1, wherein a magnetic flux density of the electromagnetic field is in a range between about 3 MHz and about 10 MHz.

12. The magnetic polymer nanocomposite of claim 1, wherein a concentration of the plurality of magnetic nanoparticles in the magnetic polymer nanocomposite is in a range between about 0.5 wt % and 2.0 wt %.

13. The system of claim 8, wherein the polymeric matrix further comprises polypyrrole (PPy), poly(methyl methacrylate (PMMA), polyethylene glycol (PEG), polypropylene, collagen, or combinations thereof.

14. The system of claim 8, wherein the plurality of magnetic nanoparticles comprise iron oxide ($Fe_3O_4$) nanoparticles, nickel oxide ($Ni_2O_3$) nanoparticles, cobalt oxide ($CoO_3$), or combinations thereof.

15. The system of claim 8, wherein a concentration of the plurality of magnetic nanoparticles in the polymeric matrix is in a range between about 0.5 wt % and 2.0 wt %.

16. The composite desiccant of claim 5, wherein a concentration of the plurality of magnetic nanoparticles in the polymeric matrix is in a range between about 0.5 wt % and 2.0 wt %.

* * * * *